(12) United States Patent
Niwa

(10) Patent No.: US 7,029,623 B2
(45) Date of Patent: Apr. 18, 2006

(54) CERAMIC BALL, BALL BEARING, MOTOR HAVING BEARING, HARD DISK DRIVE, POLYGON SCANNER, AND METHOD FOR MANUFACTURING CERAMIC BALL

(75) Inventor: Tomonori Niwa, Ichinomiya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 394 days.

(21) Appl. No.: 09/908,663

(22) Filed: Jul. 20, 2001

(65) Prior Publication Data

US 2002/0043745 A1    Apr. 18, 2002

(30) Foreign Application Priority Data

Jul. 21, 2000    (JP) .............................. 2000-220193

(51) Int. Cl.
*B28B 1/29* (2006.01)

(52) U.S. Cl. .................... 264/667; 419/68; 419/42

(58) Field of Classification Search ................ 264/667; 419/68, 42
See application file for complete search history.

(56) References Cited

U.S. PATENT DOCUMENTS

| | | | | |
|---|---|---|---|---|
| 3,813,826 A | * | 6/1974 | Bando ........................ | 451/342 |
| 4,264,556 A | * | 4/1981 | Kumar et al. ................ | 264/314 |
| 5,080,731 A | * | 1/1992 | Tabaru et al. ................ | 148/103 |
| 5,283,279 A | * | 2/1994 | Hara et al. ................... | 524/492 |
| 5,822,955 A | * | 10/1998 | Woosley et al. .............. | 53/570 |
| 6,182,496 B1 | * | 2/2001 | Bowie et al. ............... | 73/12.09 |

FOREIGN PATENT DOCUMENTS

| JP | 3-73310 A | 3/1991 |
|---|---|---|
| JP | 3026304 | 1/2000 |

OTHER PUBLICATIONS http://www.designinsite.dk (printed Mar. 19, 2005).*
Japanese Industrial Standard, JIS k 6253: 1997 "Hardness testing methods for rubber, vulcanized or themoplastic", pp. 1-22 (First English edition published in Dec. 1998, Translated and Published by Japanese Standards Association 4-1-24, Akasaka, Ninato-ku, Tokyo, 107-8440 Japan).

* cited by examiner

*Primary Examiner*—Steven P. Griffin
*Assistant Examiner*—Carmen Lyles-Irving
(74) *Attorney, Agent, or Firm*—Sughrue Mion, PLLC

(57) ABSTRACT

A method for manufacturing ceramic balls useful as ball bearings is described, wherein spherical green bodies are formed into ceramic balls having few pores and substantially uniform strength distribution, using a rubber die having a hardness not higher than 65.

2 Claims, 11 Drawing Sheets

$$\text{CUMULATIVE RELATIVE FREQUENCY } n_{rc} = \frac{N_c}{N_o} \times 100 \; (\%)$$

$N_o$: TOTAL FREQUENCY $N_c$: CUMULATIVE FREQUENCY

90% GRAIN SIZE: GRAIN SIZE CORRESPONDING TO $n_{rc}=90\%$

50% GRAIN SIZE: GRAIN SIZE CORRESPONDING TO $n_{rc}=50\%$

Fig. 15 (a)
Fig. 15 (b)
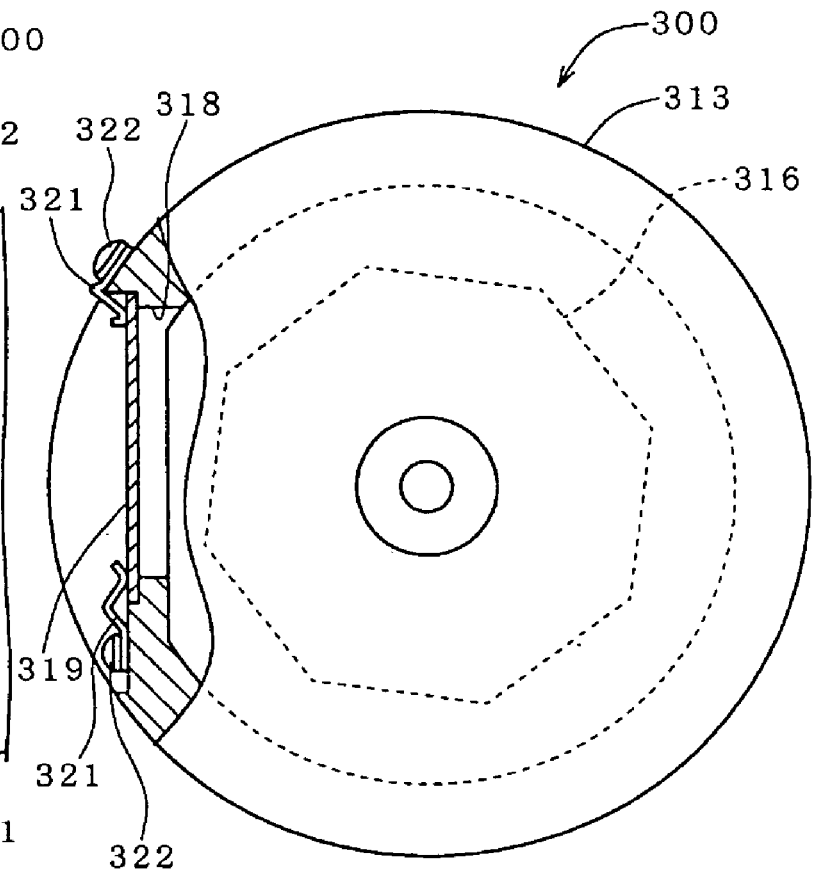
Fig. 15 (c)
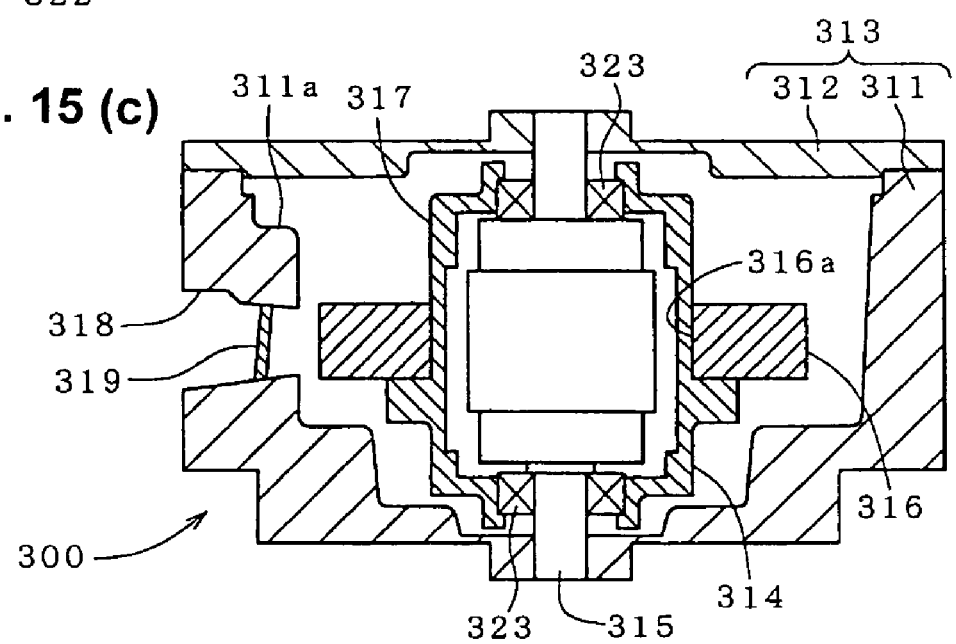

… (US 7,029,623 B2)

CERAMIC BALL, BALL BEARING, MOTOR HAVING BEARING, HARD DISK DRIVE, POLYGON SCANNER, AND METHOD FOR MANUFACTURING CERAMIC BALL

FIELD OF THE INVENTION

The present invention relates to a method for manufacturing a ceramic ball, a ceramic ball manufactured by the method, a ball bearing using the ceramic ball, a motor having a bearing using the ceramic ball, a hard disk drive using the motor, and a polygon scanner using the motor.

BACKGROUND OF THE INVENTION

Balls for use in a bearing (hereinafter called bearing balls) are generally made of metal, such as bearing steel. However, in view of higher wear resistance, bearing balls made of ceramic are becoming popular. In this connection, an effort to enhance quality of ceramic balls has been earnestly pursued.

A measure for enhancing quality of a ceramic ball is to reduce pores present in the ceramic ball. Pores present in a ceramic ball cause a failure to obtain a required strength, a failure to attain good dimensional accuracy even through surface polishing, or increase the surface roughness of the ceramic ball. Thus, in order to reduce pores in a ceramic ball, various devices are employed. An important point is to increase the relative density of a green body to the greatest possible extent.

A green body of high density can be obtained through employment of a wet, cold isostatic pressing (CIP) process. Specifically, as shown in FIG. 3, preliminary green bodies 104', each formed into a spherical shape through preliminary formation by, for example, a die pressing process, are contained in a rubber die 106. Then, the loaded rubber die 106 is placed in a soft, flexible resin bag (e.g., a polyurethane bag) 105 in a sealed condition, followed by vacuum packing. Subsequently, pressure is applied to the sealed bag 105 in a substantially isostatic condition through application of static pressure by means of a liquid pressure-application medium, such as oil or water. However, since the wet CIP process involves placement of preliminary green bodies in a resin bag in a sealed condition, vacuum packing, and removal of formed green bodies from the resin bag, the process is very poor in work efficiency, unavoidably resulting in increased manufacturing cost. In order to cope with the problem, in a dry CIP process that is becoming popular, a liquid pressure is indirectly applied, via an outer rubber die, to an inner rubber die loaded with preliminary green bodies.

However, the conventional CIP process involves difficulty in attaining uniform densification of a spherical green body. As a result, pores tend to remain in a sintered body. This problem tends to arise particularly in dry CIP, in which a liquid pressure is indirectly applied to a green body via an outer rubber die.

An object of the present invention is to provide an efficient, low-cost method for manufacturing a ceramic ball having few pores and uniform density distribution, a ceramic ball manufactured by the method, a ball bearing using the ceramic ball, a motor having a bearing using the ceramic ball, a hard disk drive using the ball bearing, and a polygon scanner using the ball bearing.

SUMMARY OF THE INVENTION

To achieve the above object, the present invention provides a method for manufacturing a ceramic ball comprising: a forming step comprising the steps of loading a rubber die with a spherical preliminary green body formed from a ceramic powder and applying pressure to the preliminary green body via the rubber die to thereby obtain a spherical green body of high density; and a firing step for firing the spherical green body. The method is characterized in that the rubber of the rubber die for accommodating the preliminary green body has a hardness not higher than 65. Herein, the hardness of rubber is durometer hardness as measured by the method prescribed in the section "Durometer Hardness Test" in JIS K6253 (1997). The durometer hardness of rubber is measured by use of a type-A durometer such that the durometer is read within 15 seconds after the pressure application surface of the durometer is brought into close contact with the rubber.

When pressure, such as liquid pressure, is applied to a rubber die loaded with a preliminary green body, the green body is compressed through application of pressure via the rubber die, to thereby be densified.

Specifically, first, as a result of application of pressure, the rubber die deforms elastically. The elastic deformation of the rubber die causes contraction of a cavity containing the green body. As a result of contraction of the cavity, and the preliminary green body is compressed. Studies conducted by the present inventors have revealed that, when the hardness of the rubber die is too high, a green body fails to be uniformly compressed and thus tends to suffer the defect of residual pores. This is thought by the present inventors to be mainly because elastic deformation of rubber for uniform contraction of the cavity does not proceed smoothly.

Further studies conducted by the present inventors revealed that there is an upper limit to the hardness of rubber used as material for a rubber die for attainment of uniform compression. Thus, the present inventors found that through employment of a rubber hardness not higher than the upper limit; specifically, through employment of a rubber hardness not higher than 65 as measured according to the aforementioned JIS code, uniform pressure can be readily applied to a preliminary green body, whereby the aforementioned object can be effectively achieved. Thus is completed the present invention. Through use of a rubber die having the above-mentioned hardness, a dense green body having uniform density distribution and few defects can be obtained; as a result, a ceramic ball obtained through firing of the green body contains few pores and exhibits substantially uniform strength distribution.

Through reduction in hardness of a rubber die, a green body having few defects, and then a sintered body having few defects can be obtained, conceivably according to the following. When the hardness of a rubber die is low; i.e., when a rubber die is flexible, elastic deformation of rubber for isostatic contraction of a die cavity proceeds smoothly, and thus rubber itself under pressure behaves as if in the near liquid state. Therefore, there can be readily established an isostatically pressure-applied condition similar to that established through direct application of liquid pressure to a green body.

When the hardness of rubber is in excess of 65, pressure to be applied becomes unlikely to propagate uniformly and sufficiently to a preliminary green body, resulting in a failure to yield a dense green body having substantially uniform density distribution. As a result, obtainment of a ceramic ball having few pores and substantially uniform strength distribution becomes difficult. Accordingly, the hardness of rubber of a rubber die is preferably not higher than 65, more preferably not higher than 40. Through employment of lower rubber hardness, a preliminary green body can be more effectively pressed. However, when the hardness of rubber of a rubber die is too low, the rubber die fails to stably maintain a shape, and the durability of the rubber die becomes insufficient. As a result, loading a rubber die with a preliminary green body becomes troublesome, and frequent replacement of rubber dies becomes necessary. Rubber of low hardness generally tends to increase in tackiness. Thus, powder tends to adhere to or remain on a rubber die, and a problem tends to arise in conveyance of a rubber die in an automated line. In view of the foregoing, the hardness of rubber to be used is not lower than 20.

BRIEF DESCRIPTION OF THE DRAWINGS

FIGS. 15(a), (b), and (c) show longitudinal sectional views show of an example of a polygon scanner using a ball bearing of FIG. 11.

DETAILED DESCRIPTION OF THE INVENTION

Figure 1:
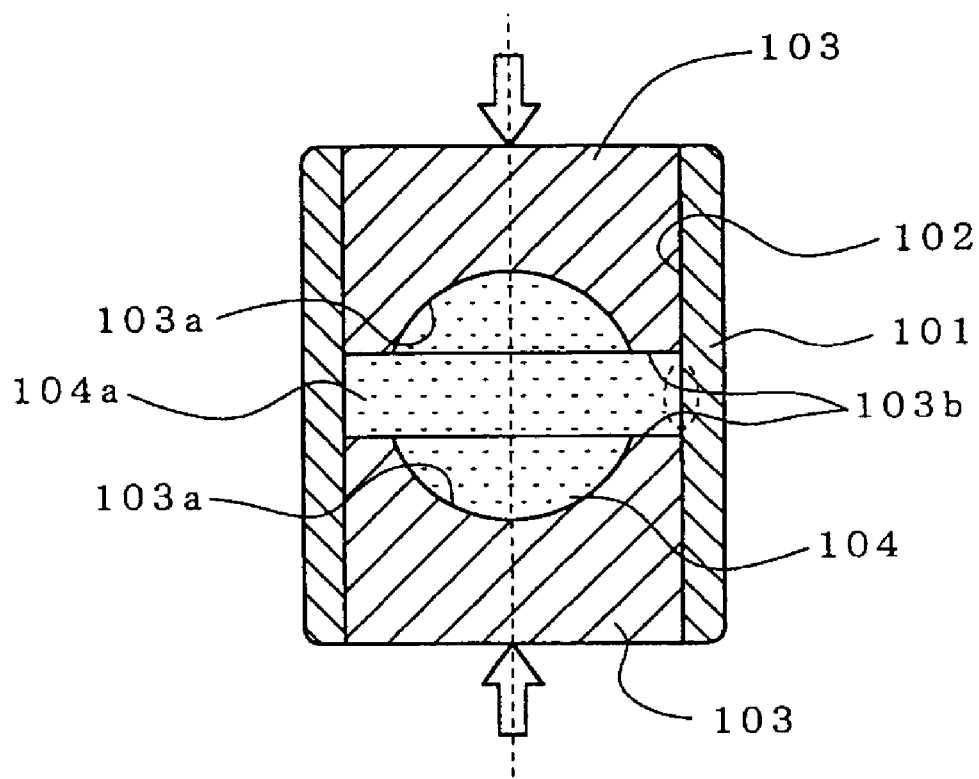
FIG. 1 is a sectional view showing a method for manufacturing a green body by a die pressing process.
Figure 2:
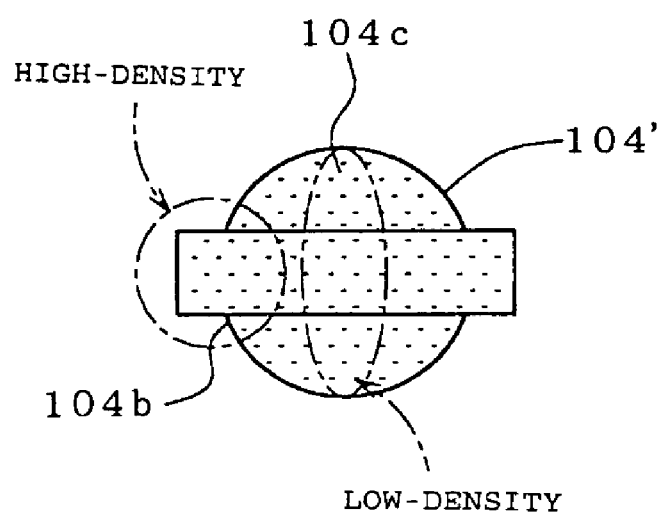
FIG. 2 is a view showing the density distribution of a green body formed by a die pressing process.
Figure 3:
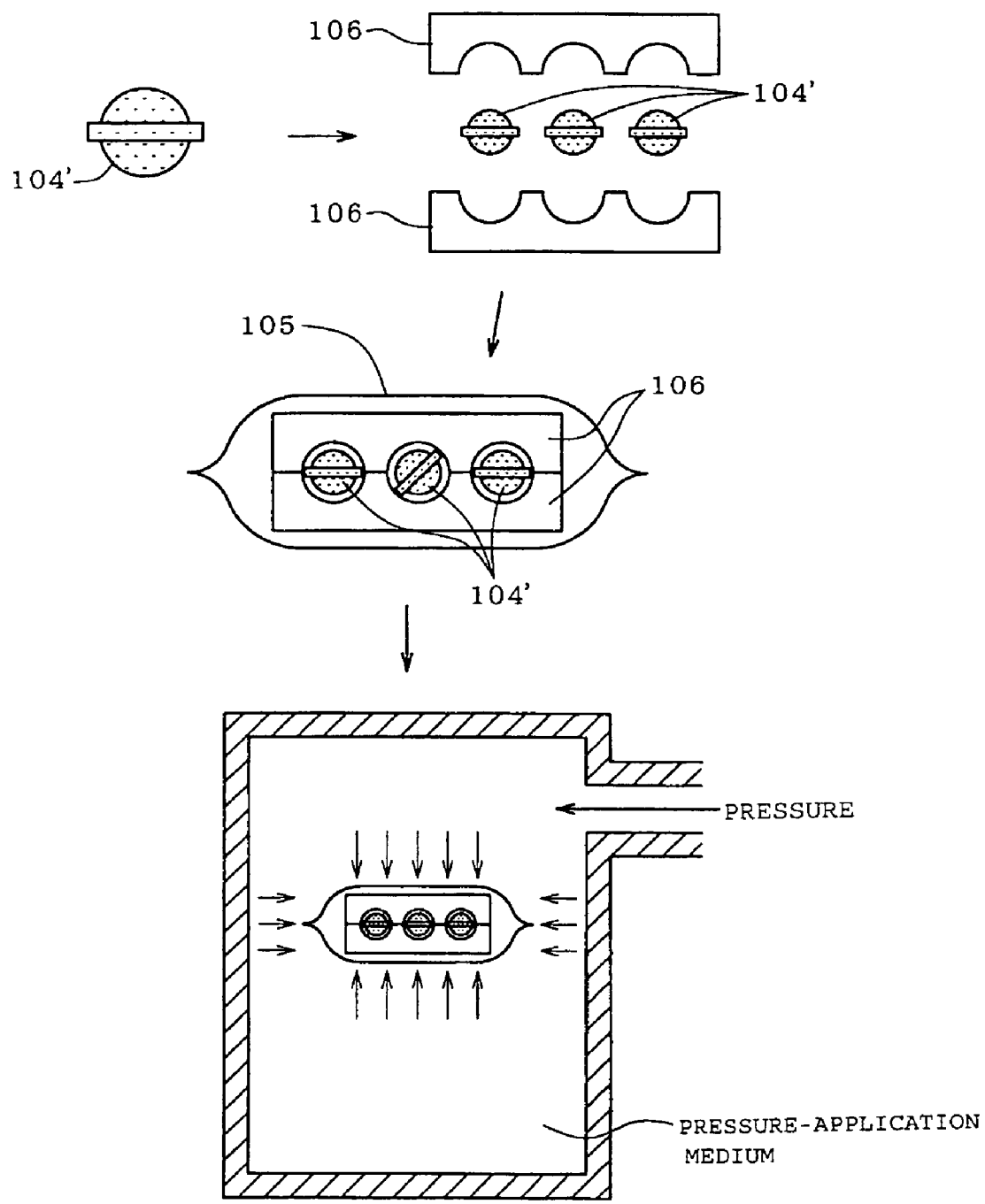
FIG. 3 is a view showing the steps of forming green bodies by a wet, cold pressing process.

A preliminary green body can be formed by a die pressing process for uniaxially pressing a material powder by means of a die having a pressing surface assuming a shape corresponding to a ceramic ball to be obtained. A die press for forming a spherical green body includes, for example, as shown in FIG. 1, a forming die 101 and upper and lower punches 103. The upper and lower punches 103 each have a hemispherical cavity 103a formed at an end face and are inserted into a die hole 102 formed in the forming die 101. Between the punches 103, powder is compressed into a spherical green body 104. However, the die pressing process involves the following problem peculiar to a spherical body to be pressed. As shown in FIG. 2, since the press stroke lessens for a portion of a green body closer to the axis of the punch, compaction tends to be impaired; i.e., density tends to be impaired (such a poor-compaction portion of a green body is hereinafter called a low-density region of a green body). Thus, the conventional pressing process using a rubber die having a hardness in excess of 65 encounters difficulty in increasing the density of a low-density region of a green body to a level substantially equal to that of the remainder of the green body. However, the method of the present invention using a rubber die having a hardness of not higher than 65 can uniformly densify a preliminary green body manufactured through die pressing and thus can yield a sintered body having few pores.

The above-mentioned method for manufacturing a ceramic ball of the present invention can be applied to a wet pressing process (e.g., a wet CIP process), in which a loaded rubber die contained in a sealed bag is subjected directly to liquid pressure. However, the method of the present invention is particularly effective when applied to a dry, cold pressing process (e.g., a dry CIP process), in which an inner rubber die is accommodated within an outer rubber die and pressure is applied indirectly to the inner rubber die via the outer rubber die. In this case, the hardness of rubber of the inner rubber die must be not higher than 65, for the following reason. Since the inner rubber die, which must deform elastically for contraction of a die cavity, is restrained by the outer rubber die, impartment of high hardness to rubber of the inner rubber die hinders elastic deformation of the inner rubber die for uniform contraction of a die cavity.

No particular limitation is imposed on the hardness of rubber of the outer rubber die. However, in view of durability and smooth elastic deformation to a certain extent following application of pressure, the hardness of rubber of the outer rubber die is preferably 30–90. Needless to say, the outer rubber die must be higher in hardness than the inner rubber die.

When a dry, cold pressing process is to be employed, the process can be implemented in the following manner. A radially outer rubber die is disposed in such a manner as to enclose an inner rubber die radially from the outside with respect to an axis passing substantially through the center of a preliminary green body. The inner rubber die is radially compressed via the radially outer rubber die, while the inner rubber die is also axially compressed by axially-pressing means.

For example, when a preliminary green body is formed through die pressing, as shown in FIG. 2, the preliminary green body tends to involve a dense portion and a coarse portion. Specifically, when an axis passing substantially through the center of a preliminary green body is oriented so as to be parallel with the direction of compression by a die press, a portion 104c of the preliminary green body located in the vicinity of the axis is longer along the direction of compression than a peripheral portion 104b of the preliminary green body located radially away from the axis. As a result, the portion 104c of the preliminary green body is not sufficiently compressed and thus becomes relatively coarse. By contrast, the peripheral portion 104b becomes relatively dense. In order to obtain a ceramic ball having uniform strength distribution, such a nonuniform density distribution of the preliminary green body must be remedied.

According to the above-mentioned method, the radially outer rubber die is disposed in such a manner as to enclose the inner rubber die radially from the outside. Liquid pressure is applied to the radially outer rubber die, whereby isostatic pressure directed radially toward the axis of the inner rubber die can be applied to the inner rubber die. Through arrangement of the axially-pressing means in contact with the axially opposite end faces of the inner rubber die, pressure can be axially applied to the inner rubber die. As a result, pressure can be isostatically applied to the entire surface of the inner rubber die; thus, the inner rubber die smoothly undergoes elastic deformation to thereby isostatically apply pressure to the preliminary green body. As a result, a green body of uniform density can be obtained.

According to the above-described method of the present invention for manufacturing a ceramic ball, a ceramic ball of the present invention featuring few pores and substantially uniform strength distribution can be obtained. Also, the present invention provides a ball bearing having a plurality of ceramic balls incorporated therein as rolling elements. The ball bearing can be used in, for example, a hard disk drive as a bearing member for a shaft for rotating a hard disk or as a bearing member for a rotary shaft for driving a head arm. Also, the ball bearing can be used as a bearing member for a shaft for rotating a polygon mirror of a polygon scanner to be used in, for example, a laser printer. The present invention also provides a motor having a bearing characterized in that the ball bearing mentioned above is used as a bearing member. The present invention further provides a hard disk drive comprising the above-mentioned motor having a bearing and a hard disk to be rotated by the motor as well as a polygon scanner comprising the above-mentioned motor having a bearing and a polygon mirror to be rotated by the motor.

Ceramic balls of a ball bearing, particularly those of a ball bearing for use in a hard disk drive (hereinafter called an HDD) or a polygon scanner, must have few pores and high strength. A pore present in a ceramic ball, particularly a pore present on the surface of a ceramic ball, generates vibration and unusual noise when used in a condition of high precision and high-speed rotation, as in an HDD or a polygon scanner. Also, a pore present in a ceramic ball impairs the strength of the ceramic ball.

A ceramic ball manufactured by the method of the present invention features few pores and substantially uniform strength distribution and thus can be favorably used as a bearing ball. When the thus-manufactured ceramic balls are used in a ball bearing of high precision and for high-speed rotation to be used in, for example, a hard disk drive (hereinafter called an HDD) or a polygon scanner, the ceramic balls can prevent occurrence of unusual vibration and an acoustic defect in the ball bearing and can maintain good performance over a long period of time.

An embodiment of the present invention is now described with reference to a silicon nitride ceramic ball. Preferably, a silicon nitride powder serving as the material to be comprised is such that the α phase makes up not less than 70% of the main phase thereof. To the silicon nitride powder, at least one element selected from the group consisting of rare-earth elements and elements belonging to Groups 3A, 4A, 5A, 3B, and 4B is added as a sintering aid in an amount of 1–15% by weight, preferably 2–8% by weight, on an oxide basis. Notably, in preparation of the material, these elements may be added in the form of not only oxide but also a compound to be converted to oxide in the course of sintering, such as carbonate or hydroxide.

Next, to the above-mentioned mixture, an aqueous solvent is added. The resultant mixture is wet-mixed (or wet-mixed and pulverized) by use of a pulverizer, such as an attriter, thereby yielding a slurry. The slurry is dried through, for example, spray drying, thereby obtaining a forming material powder.

The thus-obtained forming material powder is formed into a preliminary green body by use of the die press shown in FIG. 1. Specifically, the die press of FIG. 1 includes the forming die 101 and the upper and lower punches 103. The upper and lower punches 103 each have the hemispherical cavity 103a formed at an end face and are inserted into the die hole 102 formed in the forming die 101. The material powder is compressed between the punches 103. Preferably, the punches 103 used in such a die pressing process are such that peripheral edge portions of the punching faces of the press punches 103 are flattened so as to increase the pressing pressure in these regions. However, this process involves formation of a flange-like unnecessary portion 104a, corresponding to the flattened portions 103b, on the green body 104. This unnecessary portion 104a is removed through polishing before or after firing.

Because of uniaxial application of pressure, the preliminary green body 104' formed by use of the die press mentioned above includes a portion of high density and a portion of low density as shown in FIG. 2. Specifically, the peripheral portion 104b exhibits high density, since the peripheral portion 104 is pressed over long stroke to attain low height. By contrast, the portion 104c exhibits low density, since the portion 104c is pressed over short stroke to attain high height.

Figure 4:
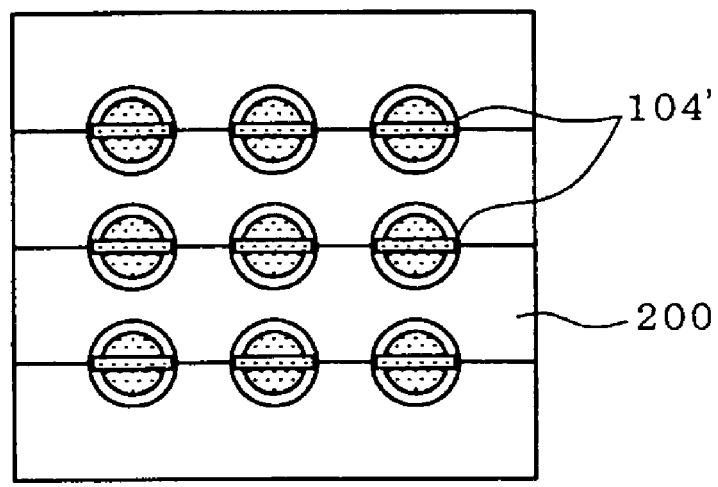
FIG. 4 is a vertical sectional view of a rubber die loaded with preliminary green bodies.
Figure 5:
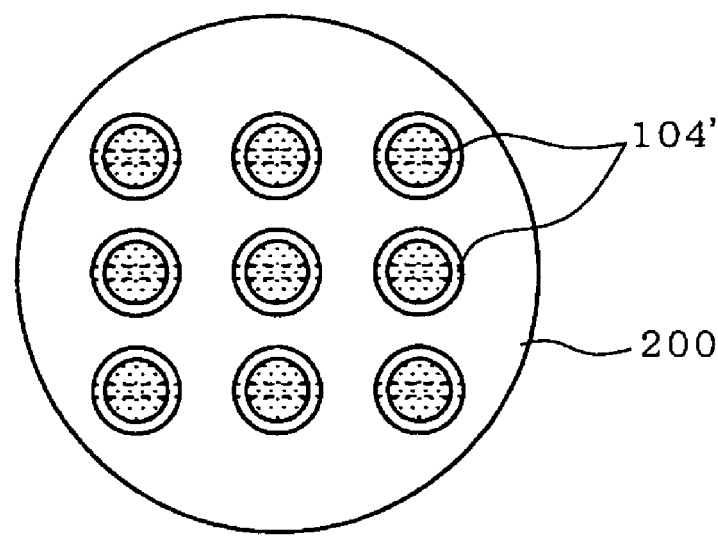
FIG. 5 is a transverse sectional view of the rubber die loaded with preliminary green bodies.

In order to eliminate the above-mentioned difference in density, the preliminary green body 104' is subjected to dry CIP by use of a rubber die shown in FIGS. 4 and 5. FIG. 4 is a longitudinal sectional view of a rubber die 200. FIG. 5 is a transverse sectional view of the rubber die 200. Preliminary green bodies 104' obtained through die pressing are placed in the rubber die 200 (which will becomes an inner rubber die to be described later). According to the present embodiment, the rubber die 200 includes platelike elements each having a plurality of hemispherical cavities formed at the opposite sides thereof. The platelike elements are arranged in layers to constitute the rubber die 200. The preliminary green bodies 104' are placed in corresponding cavities defined by hemispherical cavities formed in the adjacent upper and lower platelike elements of the rubber die 200. Thus, a number of green bodies can be obtained simultaneously and efficiently. The hardness of rubber of the rubber die 200 is 20–65, preferably 20–40.

Material for the rubber is not particularly limited. For example, silicone rubber, hard urethane, and urethane NC nylon can be effectively used in the present invention because of excellent durability. Even rubber products of the same kind can be varied in hardness, depending on cross linking density and composition. There must be used rubber whose hardness is adjusted so as to fall within the above-mentioned range through adjustment of, for example, the amount of a cross linking agent (a vulcanizing agent) to be added.

Figure 6:
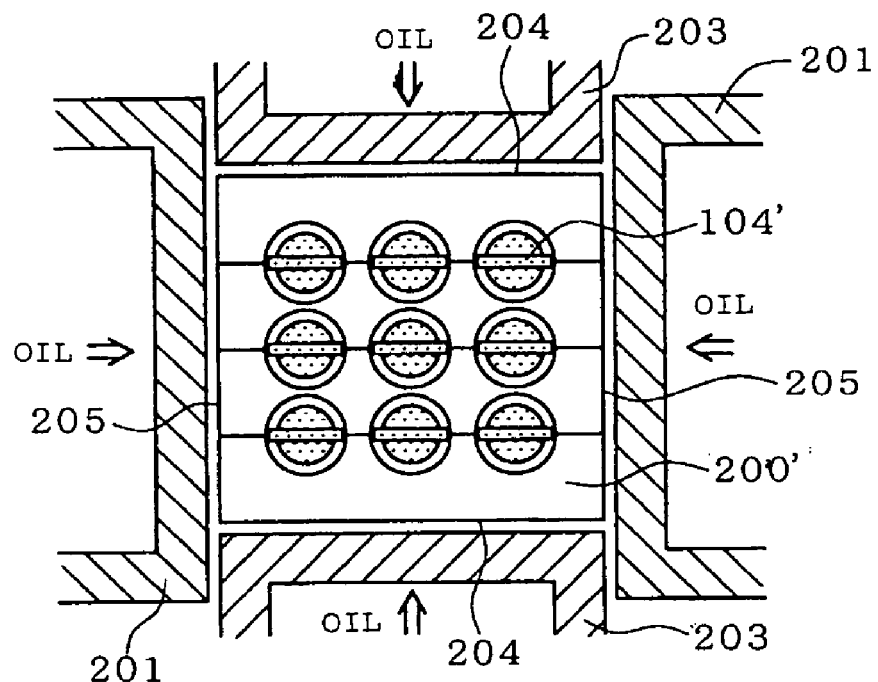
FIG. 6 is a schematic view showing an example of a dry, cold pressing process of the present invention.
Figure 7:
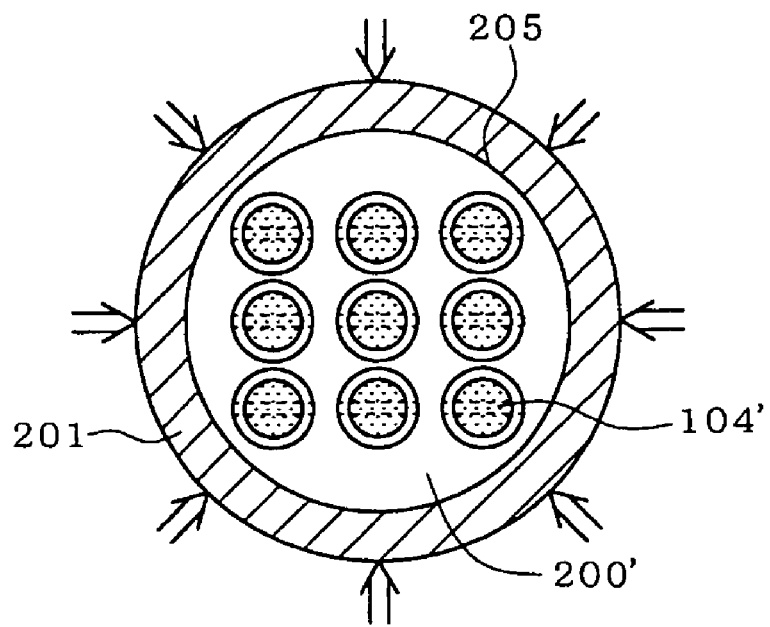
FIG. 7 is a view showing the action of a radially outer rubber die.

FIG. 6 shows an example of a step for pressing the preliminary green bodies 104' contained in the rubber die through dry, cold pressing. As shown in FIG. 6, the rubber die 200 containing the preliminary green bodies 104' is enclosed as an inner rubber die 200' by a radially outer rubber die 201 and two axially outer rubber dies 203. As shown in FIG. 7, the radially outer rubber die 201 is arranged in such a manner as to be in contact with a side wall surface 205 of the inner rubber die 200', to thereby enclose the inner rubber die 200' radially from the outside. The axially outer rubber dies 203 are arranged in such a manner as to be in contact with axially opposite end faces 204 of the inner rubber die 200'.

Liquid pressure is radially applied to the radially outer rubber die 201 by means of a pressure-application medium (e.g., water or oil) fed under pressure from an unillustrated source, to thereby radially compress the radially outer rubber die 201. As a result, the radially outer rubber die 201 radially applies pressure to the entire circumferential surface of the inner rubber die 200' (FIG. 7). Also, liquid pressure is axially applied to the axially outer rubber dies 203 by means of the pressure-application medium fed under pressure from the unillustrated source. Thus, the axially outer rubber dies 203 axially compress the inner rubber die 200'.

When liquid pressure is applied to the inner rubber die 200' as described above, the preliminary green bodies 104' contained in corresponding cavities formed in the inner rubber die 200' are subjected to substantially isostatic pressure as a result of contraction of the cavities associated with compressive deformation of the inner rubber die 200'. The thus-obtained green bodies each exhibit substantially uniform density distribution. Employment of a hardness of rubber of the inner rubber die 200' of not higher than 65 implements effective propagation of pressure; thus, a dense green body is obtained. A ceramic ball obtained through firing of such a dense green body exhibits few pores and substantially uniform strength distribution. Through axial application of pressure, pressure is applied to the substantially entire surface of the inner rubber die 200', whereby pressure can be transmitted to the preliminary green bodies 104' in a substantially isostatic manner. Thus, sufficient pressure can be applied to the coarse portions 104c (see FIG. 2) of the preliminary green bodies 104'. Accordingly, the portions 104c which are coarse in the preliminary forming stage can be densified, whereby green bodies of uniform density can be obtained. Furthermore, the preliminary green bodies 104' are placed in the inner rubber die 200' such that the direction of pressing by the axially outer rubber dies 203 is substantially in parallel with the axial direction of each of the preliminary green bodies 104', which corresponds to the direction of compression in the die pressing process. This arrangement of the preliminary green bodies 104' enables selective application of pressure to the coarse portions 104c of the preliminary green bodies 104', thereby enhancing the above-mentioned effect.

Figure 8:
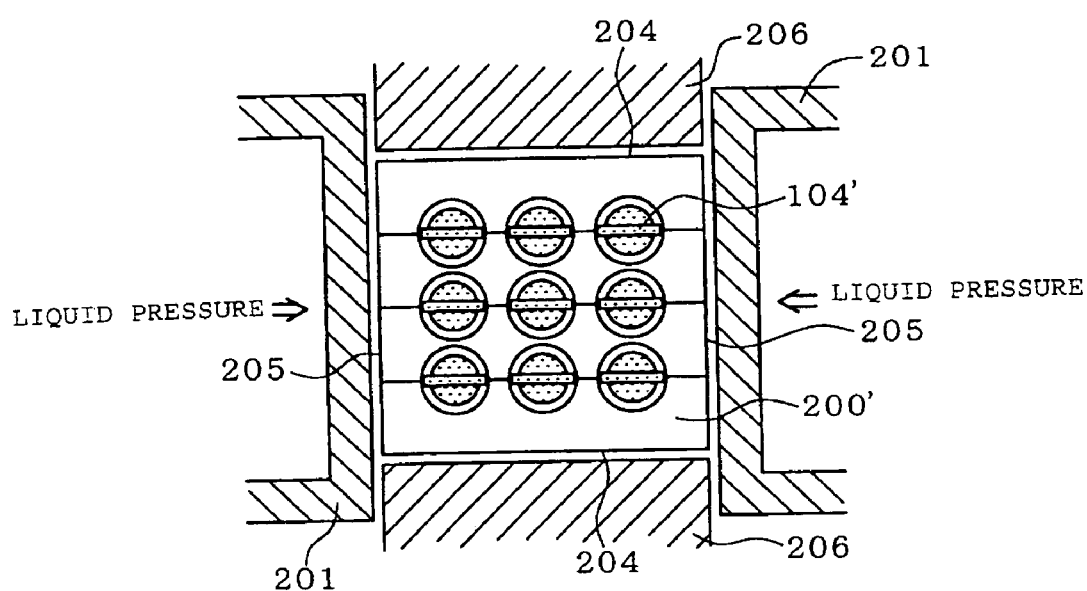
FIG. 8 is a schematic view showing another example of a dry, cold pressing process of the present invention.

The axially-pressing means may assume the form shown in FIG. 8. A pair of press punches 206 are disposed in contact with the corresponding axially opposite end faces 204 of the inner rubber die 200'. The press punches 206 are axially movable so as to move toward and away from the axially opposite end faces 204 of the inner rubber die 200'. The press punches 206 are moved toward each other to thereby axially compress the inner rubber die 200'.

Green bodies obtained by the method mentioned above are fired to thereby become spherical silicon nitride sintered bodies. Firing can be performed for example, in two stages; i.e., primary firing and secondary firing. Primary firing is performed at a temperature not higher than 1900° C. in nonoxidizing atmosphere containing nitrogen and having a pressure of 1–10 atm. such that a sintered body obtained through primary firing has a density of not less than 78%, preferably not less than 90%. When a sintered body obtained through primary firing has a density of less than 78%, the sintered body which has undergone secondary firing tends to suffer occurrence of a number of defects, such as pores remaining. Secondary firing can be performed at a temperature of 1600–1950° C. in nonoxidizing atmosphere containing nitrogen and having a pressure of 10–1000 atm. When the pressure of secondary firing is lower than 10 atm., decomposition of silicon nitride cannot be suppressed. Even when the pressure of secondary firing is increased in excess of 1000 atm., no advantage is gained with respect to effect, but rather disadvantage results with respect to cost. When the temperature of secondary firing is lower than 1600° C., a defect, such as a pore, cannot be eliminated with a resultant impairment in strength. Notably, when, under firing conditions corresponding to the above-mentioned conditions of secondary firing, sufficient densification can be attained with reduced occurrence of defect, primary firing can be omitted; i.e., a single-stage firing can be employed. Secondary firing can be performed in an atmosphere containing nitrogen and having the atmospheric pressure or a pressure of not higher than 200 atm., to thereby suppress excessive increase in surface hardness of an obtained sintered body (unfinished bearing ball). As a result, machining, such as polishing, can be performed smoothly, to thereby readily attain required dimensional accuracy of a polished bearing ball, such as required sphericity and diametral irregularity.

Figure 11:
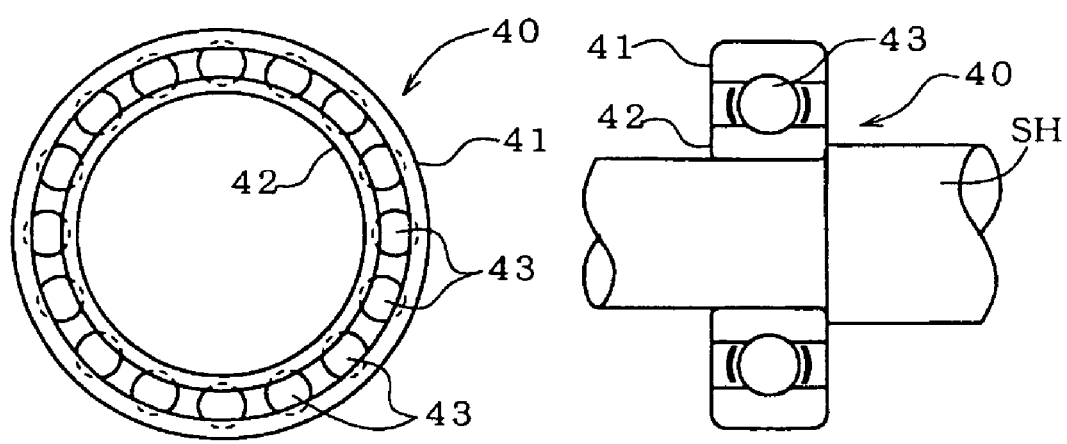
FIG. 11 is a schematic view showing a ball bearing using ceramic balls of the present invention.

As shown in FIG. 11, ceramic balls 43 obtained as above are incorporated between an inner ring 42 and an outer ring 41, which are made of, for example, metal or ceramic, thereby yielding a radial ball bearing 40. When a shaft SH is fixedly attached to the internal surface of the inner ring 42 of the ball bearing 40, the ceramic balls 43 are supported rotatably or slidably with respect to the outer ring 41 or the inner ring 42.

Figure 12:
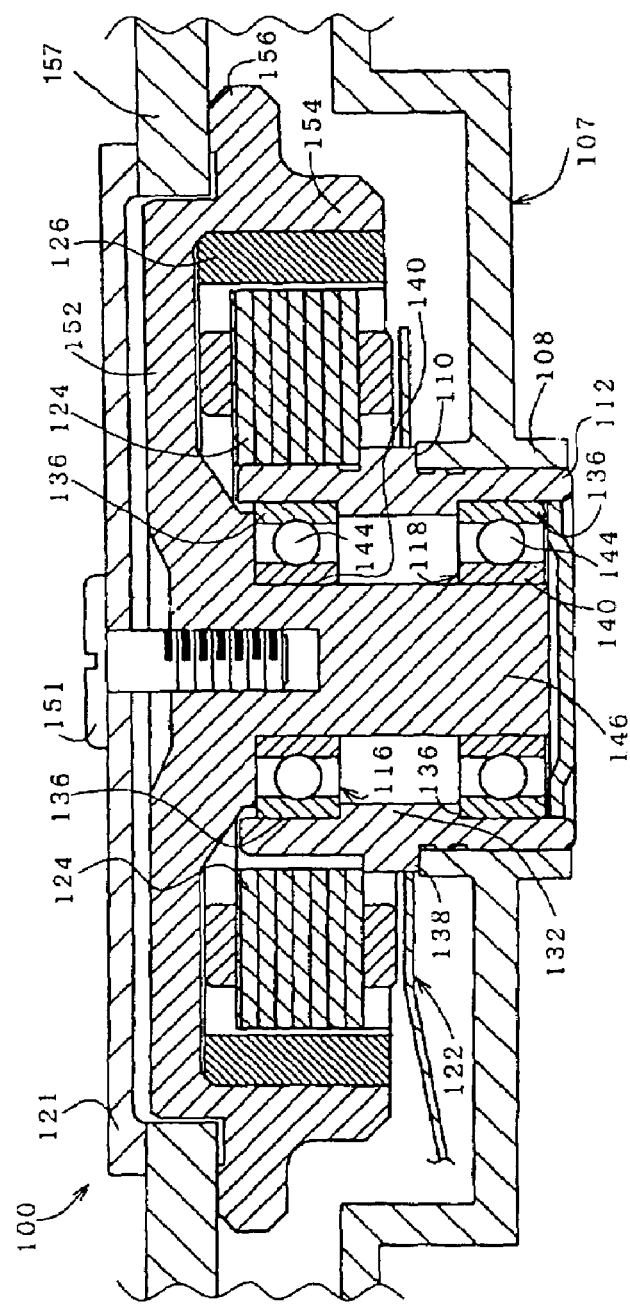
FIG. 12 is a longitudinal sectional view showing an example of a hard disk drive for computer use using the ball bearing of FIG. 11.

FIG. 12 is a longitudinal sectional view showing an example of configuration of a hard disk drive using the above-mentioned ball bearing. The hard disk drive 100 includes a body casing 107; a cylindrical shaft holder portion 108 formed at the center of the bottom of the body casing 107 in a vertically standing condition; and a cylindrical bearing holder bush 112 coaxially fitted to the shaft holder portion 108. The bearing holder bush 112 has bush fixation flanges 110 and 138 formed on the outer circumferential surface thereof and is axially positioned while the bush fixation flanges 110 and 138 abuts one end of the shaft holder portion 108. Ball bearings 116 and 118 configured in the same manner as shown in FIG. 11 are coaxially fitted into the bearing holder bush 112 at the corresponding opposite end portions of the bush 112 while abutting the corresponding opposite ends of a bearing fixation flange 132 projecting inward from the inner wall of the bearing holder bush 112 to thereby be positioned. The ball bearings 116 and 118 are configured such that a plurality of ceramic balls 144 of the present invention are disposed between an inner ring 140 and an outer ring 136.

A disk-rotating shaft 146 is fixedly fitted into the inner rings 140 of the ball bearings 116 and 118 to thereby be supported by the ball bearings 116 and 118 in a rotatable condition with respect to the bearing holder bush 112 and the body casing 107. A flat, cylindrical disk fixation member (rotational member) 152 is integrally formed at one end of the disk-rotating shaft 146. A wall portion 154 is formed along the outer circumferential edge of the disk fixation member in a downward extending condition. An exciter permanent-magnet 126 is attached to the inner circumferential surface of the wall portion 154. A coil 124 fixedly attached to the outer circumferential surface of the bearing holder bush 112 is disposed within the exciter permanent-magnet 126 in such a manner as to face the exciter permanent-magnet 126. The coil 124 and the exciter permanent-magnet 126 constitute a DC motor 122 for rotating the disk. The motor 122 and the bearings 116 and 118 constitute a motor having a bearing of the present invention while the disk-rotating shaft 146 serves as an output shaft. The maximal rotational speed of the motor 122 is not lower than 8000 rpm. When a higher access speed is required, the maximal rotational speed reaches 10000 rpm or higher, and, in a certain case, 30000 rpm or higher. The number of turns of the coil 124, the intensity of external magnetic field generated by the exciter permanent-magnet 126, a rated drive voltage, and a like design factor are determined appropriately in consideration of load for rotating the disk, so as to implement the above-mentioned maximal rotational speed. A disk fixation flange 156 projects outward from the outer circumferential surface of the wall portion 154 of the disk fixation member 152. An inner circumferential edge portion of a recording hard disk 157 is fixedly held between the disk fixation flange 156 and a presser plate 121. A clamp bolt 151 is screwed into the disk-rotating shaft 146 while extending through the presser plate 121.

When the coil 124 is energized, the motor 122 starts rotating to thereby generate a rotational drive force while the disk fixation member 152 serves as a rotor. As a result, the hard disk 106 fixedly held by the disk fixation member 152 is rotated about the axis of the disk-rotating shaft 146 supported by the bearings 116 and 118.

Figure 13:
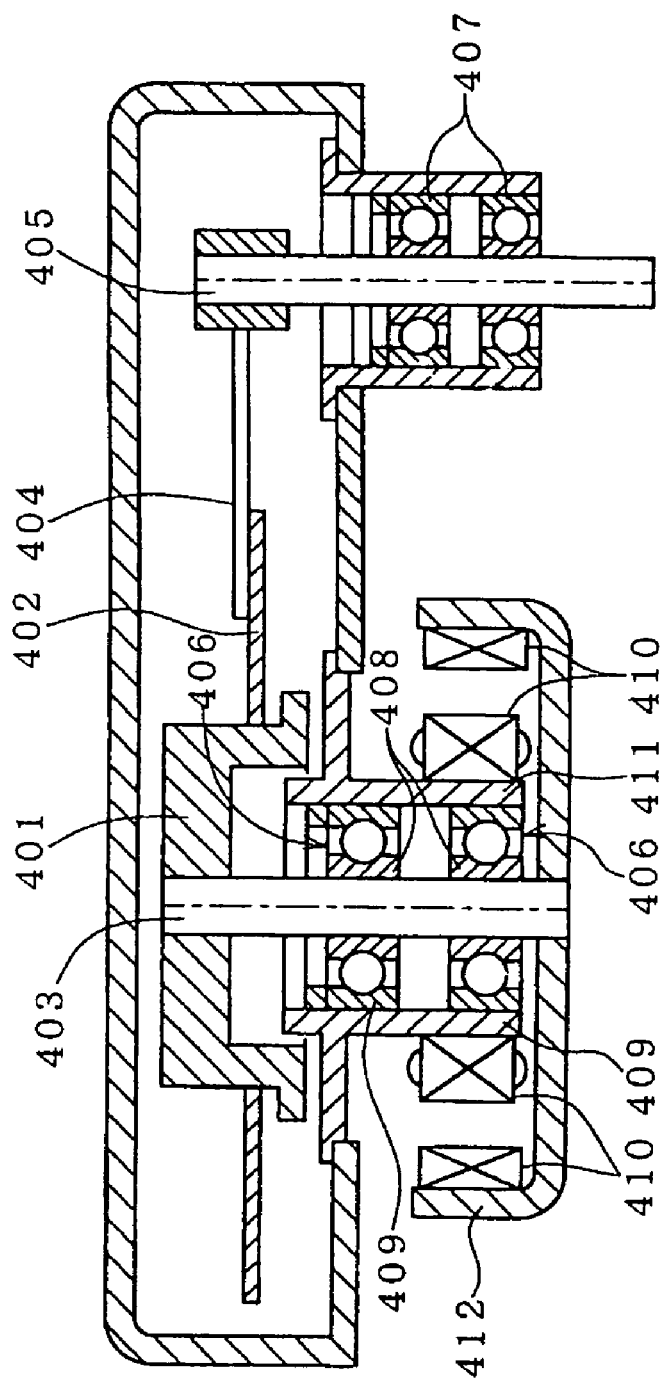
FIG. 13 is a sectional view showing an example of a hard disk drive for computer use equipped with a head arm drive mechanism.

FIG. 13 shows the structure of a hard disk drive (hereinafter abbreviated to HDD) including a head arm drive unit. The structure has two rotational shafts; i.e., a rotational shaft 403 for rotationally supporting a magnetic disk 402 via a hub 401 and a rotational shaft 405 for a head arm 404 having a magnetic head (not shown) attached to its end. The rotational shaft 403 is supported by two ball bearings 406 of the present invention disposed axially apart from each other by a certain distance, whereas the rotational shaft 405 is supported by two ball bearings 407 of the present invention disposed axially apart from each other by a certain distance. The ball bearings 406 and 407 assume the same structure as that described previously. Inner rings 408 of the paired ball bearings 406 are fixedly attached to the rotational shaft 403 so as to rotate unitarily with the rotational shaft 403. Outer rings 409 of the paired ball bearings 406 are fixedly fitted into a cylindrical stator 411 of a spindle motor 410 (the spindle motor 410 and the bearings 406 constitute a motor having a bearing of the present invention, while the rotational shaft 403 serves as an output shaft of the motor). The rotational shaft 403 is located at the center of a dish-type rotor 412 and is rotated by means of the spindle motor 410.

The magnetic disk 402, which is rotatably supported as described above, rotates at high speed according to the rotational speed of the spindle motor 410. During rotation of the magnetic disk 402, the head arm 404, to which a magnetic head for reading/writing magnetic recording data is attached, operates as appropriate. The base end of the head arm 404 is supported by an upper portion of the rotational shaft 405. The rotational shaft 405 is rotated about its axis by means of an unillustrated actuator including a voice coil motor (VCM) such that the distal end of the head arm 404 is rotated by a required angle to thereby move the magnetic head to a required position. Thus, through rotational movement of the rotational shaft 405, required magnetic recording data can be read from or written to an effective recording region of the magnetic disk 402.

FIG. 15 shows an embodiment of a polygon scanner using the above described ball bearing (FIG. 15(a) is a front view, FIG. 15(b) is a plan view, and FIG. 15(c) is a longitudinal sectional view). A polygon scanner 300 is used to generate a scanning light beam in image processing, such as photographing and copying, as well as in a laser printer. A motor 314 (herein, an outer rotor type), which serves as a motor having a bearing of the present invention, is accommodated within a substantially cylindrical enclosed case 313 composed of a body 311 and a cover 312 for covering the body 311. Opposite ends of a stationary shaft 315 are fixedly attached to the body 311 and the cover 312, respectively. A polygon mirror 316 includes a polygonal platelike member and reflectors formed on corresponding side walls of the polygonal platelike member. In the present embodiment, the polygon mirror 316 assumes the shape of a regular octagon. A rotor 317 of the motor 314 is fixedly inserted into a mounting hole 316a formed at a central portion of the polygon mirror 316, whereby the rotor 317 and the polygon mirror 316 can rotate unitarily. The rotor 317 is rotatably supported by the stationary shaft 315 via two ball bearings 323 of the present invention. The ball bearings 323 assume a structure similar to that shown in FIG. 11. The motor 314 rotates at high speed, for example, at a maximal rotational speed of not lower than 10000 rpm or 30000 rpm.

A window 318 for allowing an incoming/outgoing light beam to pass through is formed on the side wall of the body 311 in opposition to the polygon mirror 316. A window glass 319 is attached to the window 318. The window glass 319 is fitted to the window 318 from outside and is then pressed in place by means of a pair of flat springs 321. In FIG. 15(b), reference numeral 322 denotes a mounting screw for fixing the other end of the flat spring 321 on the body 311. A protrusion 311a is formed on the inner wall of the body 311 so as to provide a seat for the window glass 319.

When the motor 314 is operated, the polygon mirror 316 rotates about the axis of the stationary shaft 315. A light beam, such as a laser beam, entering through the window 318 impinges on the rotating polygon mirror 316 along a predetermined direction. Reflectors on the side walls of the rotating polygon mirror 316 sequentially reflect the incident light beam. The thus-reflected light beams are emitted through the window 318 and serve as scanning light beams.

The method for manufacturing a ceramic ball of the present invention is not limited to manufacture of a silicon nitride ceramic ball but is also applicable to manufacture of, for example, a zirconia ceramic ball, an alumina ceramic ball, or a silicon carbide ceramic ball. The thus-obtained ceramic balls can be favorably used in the above-mentioned applications.

Through employment of the composition of so-called partially stabilized zirconia, zirconia (zirconium oxide) ceramic can enhance toughness thereof through alleviation of transformation stress. $ZrO_2$ and $HfO_2$, which are predominant components of the zirconia ceramic phase, are known to undergo phase transformation, induced by change in temperature, among three different crystal structure phases. Specifically, these compounds assume the monoclinic system phase at low temperature, including room temperature; the tetragonal system phase at higher temperature; and the cubic system phase at further higher temperature. When the entire zirconia ceramic phase consists of at least one of $ZrO_2$ and $HfO_2$, substantially the entirety of the phase is considered to assume the monoclinic system phase at about room temperature. However, when an alkaline earth metal oxide or a rare earth metal oxide (e.g., calcia (CaO) or yttria ($Y_2O_3$)) serving as a stabilizing component is added in a specific amount or more to $ZrO_2$ and $HfO_2$ so as to form solid solution, the temperature of transformation between the monoclinic system phase and the tetragonal system phase is lowered, to thereby stabilize the tetragonal system phase at about room temperature.

The aforementioned phase transformation from the tetragonal system phase to the monoclinic system phase is known to be induced by the Martensitic transformation mechanism or a similar phase transformation mechanism. When external stress acts on the aforementioned tetragonal system phase, the transformation temperature increases, with the result that the tetragonal system phase undergoes stress-induced transformation. In addition, strain energy generated by the stress is consumed to induce the transformation, so that the applied stress is relaxed. Accordingly, even when stress concentrates at the end of a crack in material, through transformation from the tetragonal system phase to the monoclinic system phase, the stress is relaxed, so that propagation of cracking is stopped or mitigated. Thus, fracture toughness is enhanced.

Regarding components for stabilizing the zirconia ceramic phase, one or more species of Ca, Y, Ce, and Mg are preferably incorporated into the zirconia ceramic phase in a total amount of 1.4–4 mol % as reduced to oxides; i.e., CaO, $Y_2O_3$, $CeO_2$, and MgO, respectively. When the total amount of the components is less than 1.4 mol %, the monoclinic system phase content increases, to thereby lower the relative tetragonal system phase content. In this case, the aforementioned effect for relaxing stresses cannot be fully attained, and wear resistance of the ceramic ball might be insufficient. When the total amount of the components is in excess of 4 mol %, the cubic system phase content increases, and, similar to the above case, the wear resistance might be insufficient. Thus, the total amount of the stabilizing components is preferably 1.5–4 mol %, more preferably 2–4 mol %.

Specifically, in the present invention, $Y_2O_3$ is preferably used as the component for stabilizing the tetragonal system phase, since $Y_2O_3$ is comparatively inexpensive, and a ceramic material produced by use thereof can be endowed with high mechanical strength as compared with the case in which a ceramic material is produced by use of other stabilizing components. When CaO or MgO is used, a ceramic material produced by use thereof can be endowed with comparatively high mechanical strength, which, however, is lower than that attained by use of $Y_2O_3$. In addition, CaO and MgO are more inexpensive than $Y_2O_3$. Thus, CaO and MgO are also preferably used in the present invention. $Y_2O_3$, CaO, and MgO may be used singly or in combination of two or more species.

In the zirconia ceramic phase, the ratio of the weight of the cubic system phase (CW) to that of the tetragonal system phase (TW); i.e., CW/TW is preferably less than 1. The cubic system phase is prone to be generated when the temperature of transformation between the cubic system phase and the tetragonal system phase is lowered due to an increase in amount of the aforementioned stabilizing component or when the firing temperature is in excess of 1600° C. As compared with the monoclinic system phase and the tetragonal system phase, the cubic system phase tends to generate coarsening crystal grains during firing. The thus-coarsened crystal grains in the cubic system phase easily drop off, because interfacial bonding strength to other crystal grains is low. Furthermore, if the amount of the cubic system phase increases to such a level that the aforementioned ratio exceeds 1, the amount of such coarsened crystal grains increases accordingly. In either case, chipping resistance in formation of a sharp edge under the aforementioned conditions is impaired. Accordingly, the ratio CW/TW is controlled to less than 1, preferably less than 0.5, more preferably less than 0.1.

The information in relation to the ratio of the tetragonal system phase to the cubic system phase is obtained in the following manner. For example, a portion of the constituent ceramic of a ball is mirror-polished, and the thus-polished surface is investigated through X-ray diffractometry. In this case, the main diffraction peaks; i.e., that attributed to (1 1 1), of the tetragonal system phase and that of the cubic system phase, are observed in the obtained diffraction pattern such that the two peaks are close to each other. Therefore, initially, the amount of the monoclinic system phase is obtained from the ratio of the total intensity of (1 1 1) intensity and (1 1 –1) intensity (Im) to the sum of (1 1 1) intensity of the tetragonal system phase and that of the cubic system phase (It+Ic). Subsequently, the sintered ceramic material is mechanically crushed, and the crushed matter is again subjected to X-ray diffractometry, to thereby obtain (1 1 1) intensity I'm of the monoclinic system phase and (1 1 1) intensity I'c of the cubic system phase. Due to mechanical stress generated during the above crushing process, the tetragonal system phase of the sintered ceramic material is considered to be transformed to the monoclinic system phase. Thus, the amount of the cubic system phase can be obtained from the ratio, I'c/(I'm+I'c). The thus-obtained ratio I'c/(I'm+I'c) is 0.5 or less, preferably 0.1 or less, in view of enhancement of chipping resistance in formation of a sharp edge under the aforementioned conditions.

When alumina ceramic is to be used, a forming material powder for ceramic matrix can be prepared through addition of an appropriate sintering aid powder (e.g., a metal oxide, such as an Mg oxide, a Ca oxide, an Si oxide, and an Na oxide) to an alumina powder. Preferably, the thus-obtained ceramic matrix contains the above-mentioned sintering aid component in an amount of 0.1–10% by weight on an oxide basis and an Al component which constitutes the balance on $Al_2O_3$ basis.

EXAMPLE

In order to examine the effects of the present invention, the following experiment was carried out. A silicon nitride powder (silicon nitride purity: 98% by weight; average grain size: 0.5 μm; 90% grain size: 1.0 μm; and BET specific surface area: 10 $m^2/g$) was prepared as a material powder. A yttria powder (average grain size: 0.6 μm; 90% grain size: 1.0 μm; and BET specific surface area: 10 $m^2/g$) and an alumina powder (average grain size: 0.4 μm; 90% grain size: 1.0 μm; and BET specific surface area: 10 $m^2/g$) were prepared as sintering aid components. The average grain size was measured by use of a laser diffraction granulometer (model LA-500, product of Horiba, Ltd.). The BET specific surface area was measured by use of a BET-specific-area measuring device (MULTISORB 12, product of Yuasa Ionics, Corp.).

Figure 9:
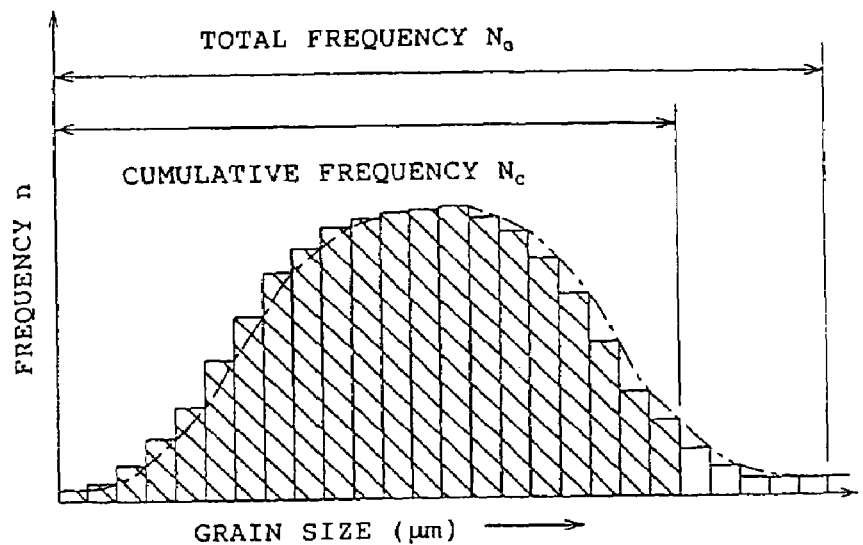
FIG. 9(a) and FIG. 9(b) are views showing the concept of cumulative relative frequency.
Figure 9:
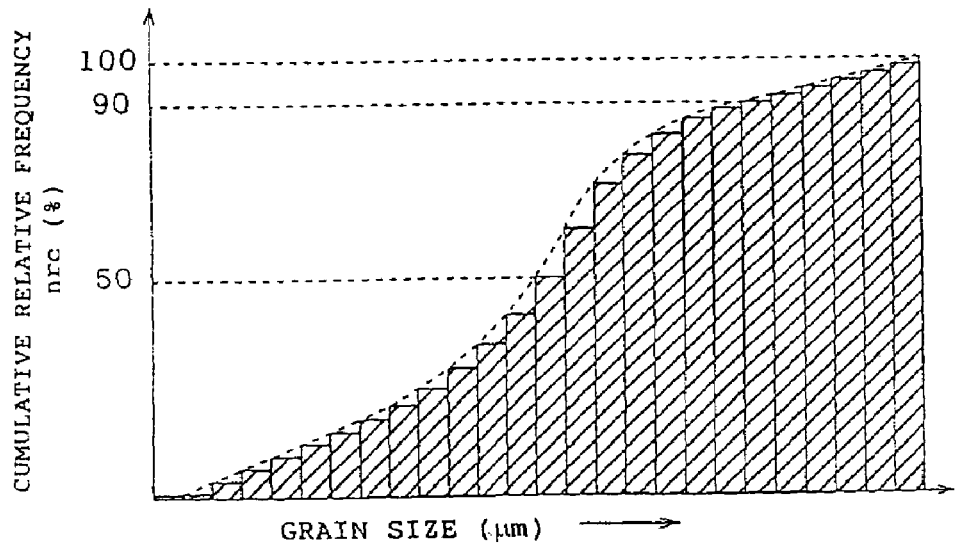
Figure 10:
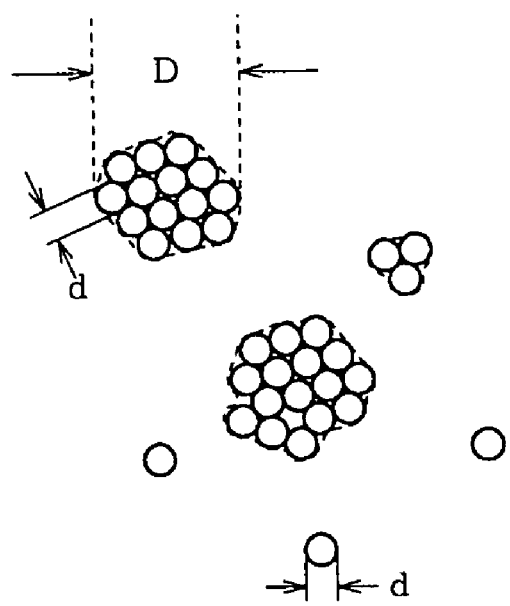
FIG. 10 is a view showing the concept of the diameter of a primary particle and the diameter of a secondary particle.

The grain size measured by means of a laser diffraction granulometer reflects the diameter of a secondary particle D shown in FIG. 10. The cumulative relative frequency with respect to grain size as measured in the ascending order of grain size is defined in the following manner. As shown in FIGS. 9(a) and 9(b), frequencies of grain sizes of particles to be evaluated are distributed in the ascending order of grain size. In the cumulative frequency distribution of FIG. 9(a), Nc represents the cumulative frequency of grain sizes up to the grain size in question, and N0 represents the total frequency of grain sizes of particles to be evaluated. The relative frequency nrc is defined as "(Nc/N0)×100 (%)." The X % grain size refers to a grain size corresponding to nrc=X (%) in the distribution of FIG. 9(b). For example, the 90% grain size is a grain size corresponding to nrc=90 (%).

A BET specific surface area is measured by the adsorption method. Specifically, the specific surface area can be obtained from the amount of gas adsorbed on the surface of powder particles. Since molecules of adsorbed gas penetrate into a secondary particle to thereby cover individual constituent primary particles of the secondary particle, the specific surface area obtained by the adsorption method reflects the specific surface area of a primary particle and thus reflects the average value of the diameter of a primary particle d shown in FIG. 10.

The above-mentioned material powders were mixed according to the following composition: silicon nitride powder 100 parts by weight; yttria powder 3 parts by weight; and alumina powder: 3 parts by weight. To the powder mixture (100 parts by weight), pure water (50 parts by weight) serving as solvent and an organic binder (an appropriate amount) were added. The resulting mixture was mixed for 10 hours by means of an attriter mill, thereby obtaining a slurry. The slurry was dried by a spray dry process, thereby obtaining a forming material powder.

Next, the thus-obtained forming material powder was subjected to preliminary forming by use of the die press shown in FIG. 1, thereby obtaining preliminary green bodies. The preliminary green bodies were placed in a rubber die (material: silicone rubber) having a durometer hardness of 35 prescribed in JIS K6253 (1997). The loaded rubber die was set as an inner rubber die on a dry, cold pressing machine having a radially outer rubber die and axially outer rubber dies (hardness: 78; and material: neoprene rubber), followed by pressing. A pressure of 200 Pa was applied radially and axially for compression, thereby obtaining spherical green bodies. The resulting green (unfired) bodies are then removed from the rubber mold. The thus-obtained spherical green bodies underwent primary firing for 2 hours at a temperature of 1550–1700° C. in a nitrogen atmosphere at the atmospheric pressure and then underwent secondary firing for 2 hours at a temperature of 1650–1700° C. in a nitrogen atmosphere at a pressure of 50–100 atm. The resulting sintered bodies were polished to form silicon nitride ceramic balls by use of a wet precision polishing machine and a grooved surface-plate grindstone (abrasive No.: #20000).

For comparison, green bodies were manufactured by use of an inner rubber die (material: neoprene rubber) having a rubber hardness falling outside the scope of the present invention. See Sample 4, below. The thus-obtained green bodies were sintered under the above-mentioned conditions, thereby obtaining silicone nitride ceramic balls of a comparative example.

Cross sections of the obtained ceramic balls were observed by use of a metallograph (at 1000 magnifications). The observation images were analyzed to thereby obtain the cumulative area percentage of pores each having a size of not less than 1 μm and the average number of pores each having a size of not less than 1 μm present in a unit area of 1 mm². On the basis of the measured results, the ceramic balls were evaluated. Specifically, the area and the number of pores each having a size of not less than 1 μm observed within a field measuring 100 μm×100 μm were measured and converted to the cumulative area percentage and the number of pores present in a unit area of 1 mm². This measurement was carried out with respect to five arbitrarily selected fields. Five measured values were averaged to obtain the final cumulative area percentage of pores and the final number of pores present in a unit area of 1 mm². The ceramic balls were evaluated according to the following criteria: acceptable (O): not greater than 1% in cumulative area percentage of pores each having a size of not less than 1 μm and less than 500 in average number of pores each having a size of not less than 1 μm present in a unit area of 1 mm²; and not acceptable (X): in excess of 1% in cumulative area percentage and not less than 500 in average number of pores present in a unit area of 1 mm². The results are shown in Table 1.

TABLE 1

| Sample No. | Hardness of Rubber | Cumulative Area Percentage of Pores (%) | Number of Pores [pieces/mm²] | Eval. |
|---|---|---|---|---|
| 1 | 35 | 0.1 | 100 | O |
| 2 | 55 | 0.1 | 240 | O |
| 3 | 60 | 0.9 | 490 | O |
| 4* | 70 | 1.1 | 11000 | X |

A sample marked with * falls outside the scope of the invention.

Figure 14:
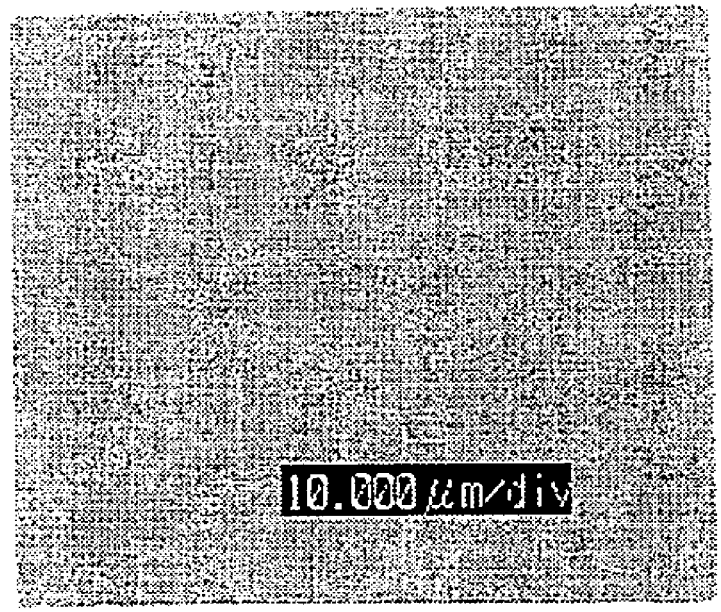
FIG. 14(a) and FIG. 14(b) are images showing polished surfaces of ceramic balls of an Example (FIG. 14(a)) and a Comparative Example (FIG. 14(b)) as observed through a metallograph.
Figure 14:
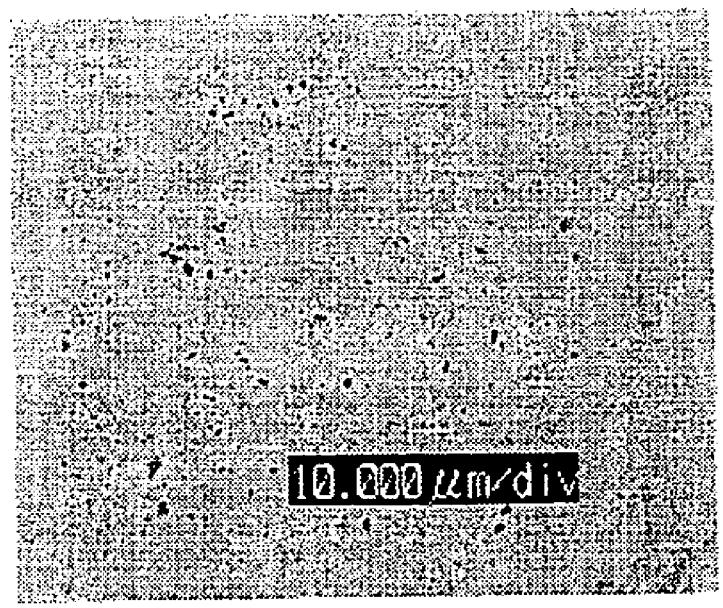

As seen from Table 1, the method for manufacturing a ceramic ball of the present invention-in which a preliminary green body contained in a rubber die having a hardness of rubber of not higher than 65 is pressed to thereby become a green body, and then the green body is fired-is advantageous in view of manufacture of a ceramic ball having few pores and uniform density distribution. FIG. 14(a) is an image of the polished surface of Sample No. 1 as observed through a metallograph. FIG. 14(b) is an image of the polished surface of Sample No. 4 (Comparative Example) as observed through a metallograph. A number of black spots indicative of pores are observed on the latter image, whereas almost no pores are observed on the former image.

While the present invention has been described above with reference to specific embodiments, the present invention is not limited thereto.

This application is based on Japanese Patent Application No. 2000-220193 filed Jul. 21, 2000, the disclosure of which is incorporated herein by reference in its entirety.

What is claimed is:

1. A method for manufacturing a ceramic ball, comprising:
   a forming step comprising the steps of loading a rubber die with a spherical preliminary green body formed from a ceramic powder and applying pressure to the preliminary green body via the rubber die to thereby obtain a spherical green body of high density; and
   a firing step for firing the spherical green body;
   wherein the rubber of the rubber die for accommodating the preliminary green body has a durometer hardness not higher than 65;
   wherein said forming step is a dry, cold pressing process in which an inner rubber die is accommodated within an outer rubber die, and pressure is indirectly applied to the inner rubber die via the outer rubber die, and wherein the rubber of the inner rubber die has a durometer hardness not higher than 65; and
   wherein, in said dry, cold pressing process, a radially outer rubber die is disposed in such a manner as to enclose the inner rubber die radially from the outside with respect to an axis passing substantially through a center of the preliminary green body and wherein the inner rubber die is radially compressed via the radially outer rubber die, while the inner rubber die is also axially compressed by axially-pressing means.

2. A method for manufacturing a ceramic ball comprising:

a forming step comprising the steps of loading a rubber die with a spherical preliminary green body formed from a ceramic powder and applying pressure to the preliminary green body via the rubber die to thereby obtain a spherical green body of high density; and a firing step for firing a spherical green body;

wherein the rubber of the rubber die for accommodating the preliminary green body has a durometer hardness not higher than 65;

wherein said forming step is a dry, cold pressing process in which an inner rubber die is accommodated within an outer rubber die, and pressure is indirectly applied to the inner rubber die via the outer rubber die, and wherein the rubber of the inner rubber die has a durometer hardness not higher than 65;

wherein the preliminary green body is formed by a die pressing process for uniaxially pressing a material powder by means of a die having a pressing surface assuming a shape corresponding to a ceramic ball to be obtained; and wherein, in said dry, cold pressing process, a radially outer rubber die is disposed in such a manner as to enclose the inner rubber die radially from the outside with respect to an axis passing substantially through a center of the preliminary green body and wherein the inner rubber die is radially compressed via the radially outer rubber die, while the inner rubber die is also axially compressed by axially-pressing means.

* * * * *